United States Patent
Takeda et al.

(10) Patent No.: US 10,814,470 B2
(45) Date of Patent: Oct. 27, 2020

(54) ELECTRICALLY POWERED TOOL

(71) Applicant: Koki Holdings Co., Ltd., Tokyo (JP)

(72) Inventors: Yuuki Takeda, Ibaraki (JP); Kyouichi Nakayama, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 171 days.

(21) Appl. No.: 16/074,435

(22) PCT Filed: Feb. 17, 2017

(86) PCT No.: PCT/JP2017/005914
§ 371 (c)(1),
(2) Date: Aug. 1, 2018

(87) PCT Pub. No.: WO2017/154523
PCT Pub. Date: Sep. 14, 2017

(65) Prior Publication Data
US 2019/0039227 A1 Feb. 7, 2019

(30) Foreign Application Priority Data

Mar. 5, 2016 (JP) .................................. 2016-042903

(51) Int. Cl.
*B25F 5/00* (2006.01)
*H02P 27/08* (2006.01)
(Continued)

(52) U.S. Cl.
CPC .............. *B25F 5/008* (2013.01); *B24B 23/02* (2013.01); *B24B 23/028* (2013.01);
(Continued)

(58) Field of Classification Search
USPC .......................................... 173/217, 216, 48
See application file for complete search history.

(56) References Cited

U.S. PATENT DOCUMENTS 6,286,609 B1 9/2001 Carrier et al.
9,190,947 B2 * 11/2015 Yanagihara ............. H02P 23/00
(Continued)

FOREIGN PATENT DOCUMENTS

EP    2667502    11/2013
EP    2926952    10/2015
(Continued)

OTHER PUBLICATIONS

"International Search Report (Form PCT/ISA/210)" of PCT/JP2017/005914, dated May 16, 2017, with English translation thereof, pp. 1-9.

(Continued)

*Primary Examiner* — Nathaniel C Chukwurah
(74) *Attorney, Agent, or Firm* — JCIPRNET

(57) ABSTRACT

A rectifier circuit for rectifying an AC voltage supplied from a commercial power supply into a DC voltage, a smoothing capacitor for smoothing the output of the rectifier circuit, and an electrically powered tool for supplying the smoothed pulsating DC voltage to a motor by an inverter circuit, wherein when the motor is driven while no load is being applied to a tip tool, the smoothed DC voltage repeatedly generates a maximal value and a minimum value so as to synchronize with the fluctuation in the AC voltage. During no-load rotation, control is performed so that driving is performed at a value that is less than a threshold value $D_1$ for the duty ratio at which the generation of a gear sound starts in any of the speed dial setting values 1-6. It is thereby possible to suppress a gear sound generated by a power transmission mechanism during no-load rotation.

13 Claims, 6 Drawing Sheets

(51) Int. Cl.
    *H02P 6/08*     (2016.01)
    *B24B 23/02*    (2006.01)
    *B24B 41/00*    (2006.01)

(52) U.S. Cl.
    CPC .............. *B24B 41/007* (2013.01); *B25F 5/00* (2013.01); *H02P 6/08* (2013.01); *H02P 27/08* (2013.01); *B25D 2217/0061* (2013.01)

(56) References Cited

U.S. PATENT DOCUMENTS

| | | | | |
|---|---|---|---|---|
| 2005/0245182 | A1* | 11/2005 | Deshpande | B24B 23/03 451/357 |
| 2012/0014065 | A1* | 1/2012 | Haga | B25B 21/002 361/697 |
| 2017/0070168 | A1* | 3/2017 | Takano | H02P 27/08 |

FOREIGN PATENT DOCUMENTS

| | | |
|---|---|---|
| JP | 2010-269409 | 12/2010 |
| JP | 2012-151962 | 8/2012 |
| JP | 2012-196725 | 10/2012 |
| JP | 2013-202774 | 10/2013 |
| JP | 2015-037822 | 2/2015 |
| WO | 2013147323 | 10/2013 |

OTHER PUBLICATIONS

"Search Report of Europe Counterpart Application", dated Jan. 28, 2020, p. 1-p. 7.

\* cited by examiner

| DIAL SETTING VALUE (191) | ROTATION SPEED (192) | DUTY RATIO (193) |
| --- | --- | --- |
| 6 | 9,500 | 68% |
| 5 | 8,000 | 47% |
| 4 | 6,800 | 30% |
| 3 | 4,600 | 14% |
| 2 | 3,500 | 11% |
| 1 | 2,800 | 10% |

FIG. 6

ELECTRICALLY POWERED TOOL

CROSS-REFERENCE TO RELATED APPLICATION

This application is a 371 application of the International PCT application serial no. PCT/JP2017/005914, filed on Feb. 17, 2017, which claims the priority benefit of Japan Patent Application No. 2016-042903, filed on Mar. 5, 2016. The entirety of each of the above-mentioned patent applications is hereby incorporated by references herein and made a part of this specification.

FIELD OF THE INVENTION

The present invention relates to an electrically powered tool with a motor driven by an AC voltage supplied from a commercial power supply, particularly, to an improvement in rotation control of a motor.

DESCRIPTION OF RELATED ART

An electrically powered tool for rectifying an AC voltage supplied from a commercial power supply to drive a brushless motor is known. In a brushless motor, a rotational position of a rotor is detected using a magnetic sensor and then controlled by a controller to supply a drive current from an inverter circuit to a predetermined winding of the motor. A technique of Patent Literature 1 is known as an example of an electrically powered tool (a grinder) using such a brushless motor. In Patent Literature 1, a brushless motor is accommodated coaxially with a cylindrical housing. A stator having a coil is disposed on an outer circumferential side of the motor, and a rotor core which is rotated by a rotating shaft and holds a permanent magnet is provided on an inner circumferential side thereof. The rotating shaft is pivotally supported by bearings on a front side and a rear side of the motor, and a cylindrical sensor magnet for detecting the rotational position of the rotor is provided behind the rear side bearing. A controller for controlling the motor and a power supply circuit are accommodated inside the rear side of the housing. Also, an inverter circuit for supplying a rotating magnetic field (three-phase alternating current) to the coil of the motor is mounted.

Generally, an electric device with a motor driven by a commercial power supply includes a rectifier circuit for rectifying an AC voltage supplied from a commercial power supply to a pulsating DC voltage, and a smoothing circuit including a smoothing capacitor for smoothing the pulsating DC voltage. At this time, since a capacity of the smoothing capacitor is set to be relatively large, the pulsating DC voltage is often smoothed to a sufficiently smoothed DC voltage. However, in such a circuit, there is a characteristic that current flows from the rectifier circuit to the smoothing capacitor only during a period when the DC voltage output from the rectifier circuit is higher than a voltage generated in the smoothing capacitor.

When the capacity of the smoothing capacitor is set to be large, the period during which the current flows from the rectifier circuit to the smoothing capacitor tends to be shortened. As a result, a current including a harmonic component flows through the commercial power supply, and a load on power transmission equipment increases, which is not preferable. Further, the commercial power supplied from the power transmission equipment is connected to the electrically powered tool via a distribution board located in a home, but since there is an upper limit on a magnitude of the current which can flow in the distribution board, it is also important that the current not exceed this upper limit. In addition, since a power factor deteriorates as the harmonic component contained in the current increases, a large current flows to the commercial power supply only when a small current flows through the motor of the electrically powered tool, and thus it is important to improve the power factor.

Patent Literature 2 discloses an electrically powered tool having a rectifier circuit which rectifies an AC voltage supplied from a commercial power supply to a pulsating DC voltage and a smoothing capacitor which slightly smoothes the pulsating DC voltage. In this technique, a period during which the current flows from the rectifier circuit to the smoothing capacitor is lengthened by setting a capacity of the smoothing capacitor to be relatively small, and thus the harmonic component contained in the current flowing in the commercial power supply is reduced. Furthermore, accommodating space is saved by setting the capacity of the smoothing capacitor to be relatively small, and the rectifier circuit and the smoothing capacitor can be built in the electrically powered tool.

CITATION LIST

Patent Literatures

[Patent Literature 1]
Japanese Patent Application Publication No. 2010-269409
[Patent Literature 2]
Japanese Patent Application Publication No. 2012-196725
[Patent Literature 3]
Japanese Patent Application Publication No. 2013-202774

SUMMARY OF INVENTION

Technical Problem

In the electrically powered tool described in Patent Literature 2, since the capacity of the smoothing capacitor is relatively small, a voltage supplied from the smoothing capacitor to the motor largely pulsates to synchronize with a frequency of the commercial power supply. Accordingly, when the motor rotates, a current flows from the smoothing capacitor toward the motor during a period in which the voltage output from the smoothing capacitor toward the motor is larger than an induced voltage generated by rotation of the motor, but no current flows from the smoothing capacitor toward the motor during a period in which the voltage output from the smoothing capacitor toward the motor is equal to or lower than the induced electromotive voltage generated by the rotation of the motor. Accordingly, a torque generated from the motor greatly pulsates, and this pulsation may cause difficulty in controlling the electrically powered tool.

On the other hand, in the electrically powered tool described in FIGS. 9 and 10 of Patent Literature 3, a duty ratio of PWM control is set to be small in a period when the voltage output from the rectifier circuit is in the vicinity of a maximum value, such that the voltage output from the smoothing capacitor toward the motor decreases, and the duty ratio of the PWM control is set to be large in a period when the voltage output from the rectifier circuit is in the vicinity of a minimum value, such that the voltage output from the smoothing capacitor toward the motor increases. In this way, the pulsation of the torque generated from the motor is minimized by reducing the pulsation of the voltage output from the smoothing capacitor toward the motor. However, frequent switching of the duty ratio of the PWM control is a heavy burden on a microcomputer (hereinafter referred to as "microcomputer") which performs the PWM control, and thus it is necessary to use an expensive microcomputer with high processing speed.

In a process of examining these problems, the inventors found that, by alternately generating a period in which no current flows in the motor and a period in which a current flows in the motor, the torque generated from the motor may pulsate and noise may be generated from a power transmission mechanism that transmits a driving force of the motor to a tip tool. Specifically, in the case in which the torque generated from the motor pulsates in a state in which no load is applied to the motor, since the motor tries to rotate at the pulsating rotation speed while the tip tool tries to maintain a constant rotation speed by inertia, gears constituting the power transmission mechanism interposed between the tip tool and the motor repeatedly collide and disengage, thereby generating a rotation sound, a striking sound, or the like which is different from usual.

The present invention has been made in view of the above background, and an object of the present invention is to provide an electrically powered tool which minimizes noise generated from a power transmission mechanism during no-load rotation. Another object of the present invention is to provide an electrically powered tool capable of minimizing a harmonic component contained in a current flowing through a commercial power supply.

Solution to Problem

Representative features of the invention disclosed in the present application will be described as below. According to one feature of the present invention, there is provided an electrically powered tool including a rectifier circuit configured to rectify an AC voltage supplied from a commercial power supply to a pulsating DC voltage, a smoothing circuit having a smoothing capacitor configured to reduce a pulsation state of the pulsating DC voltage, a circuit configured to supply the smoothed DC voltage to a motor, and a power transmission mechanism configured to transmit a driving force of the motor to a tip tool using a plurality of gears, wherein a current continuously flows to the motor when the motor is driven in a state in which no load is applied to the tip tool, and a current intermittently flows to the motor when the motor is driven in a state in which a load is applied to the tip tool. Further, a switching element provided between the smoothing circuit and the motor and configured to control a voltage supplied to the motor, and a controller configured to control rotation of the motor by driving the switching element may be provided, and the controller may reduce PWM duty ratio of the switching element so that, in a case in which the motor is rotated in a state in which no load is applied to the tip tool, the smoothed DC current supplied to the switching element pulsates at a frequency twice a frequency of input commercial power supply and there is no current zero section when the pulsating direct current is minimized. Since the motor is configured so that the current continuously flows when the motor is driven in the state in which no load is applied to the tip tool, a torque generated from the motor is stabilized, and thus noise generated from the power transmission mechanism can be minimized. Further, since the motor is configured such that the current intermittently passes through the motor when the motor is driven in the state in which a load is applied to the tip tool, it is possible to reduce harmonic components contained in the current flowing through the commercial power supply.

According to another feature of the present invention, an inverter circuit may be formed using a plurality of switching elements, the inverter circuit may be provided between the smoothing circuit and the motor, and the controller may maintain an effective value of a minimum value of the direct current which repeatedly fluctuates between a maximum value and the minimum value to be synchronized with a fluctuation of the AC voltage at zero or more via controlling the PWM duty ratio of the inverter circuit during no-load rotation of the motor. Further, a rotation speed setting unit connected to the controller to set a rotation speed of the motor may be provided, and regardless of a rotation speed set by the rotation speed setting unit, the effective value of the minimum value of the direct current may be maintained at zero or more during no-load rotation. Furthermore, a capacity of the smoothing capacitor may be set to be small such that there is a section in which the minimum value of the effective value of the direct current at the time of a load in which work on a workpiece is performed by the tip tool becomes zero. When the motor is driven in the state in which a load is applied to the tip tool, a large current tends to flow, and the harmonic components contained in the current tend to be larger. However, in such a case, the capacity of the smoothing capacitor can be set to be small such that a current intermittently flows to the motor, and the harmonic components contained in the current can be minimized.

According to yet another feature of the present invention, a controller configured to control a rotation speed of the motor may be provided in the electrically powered tool, the controller may control the motor at a constant speed to maintain a set rotation speed, and a duty ratio at the time of no-load rotation set by the controller may be set not to become zero even in the vicinity of a minimum value of the smoothed DC voltage. Further, a rotation speed setting unit configured to set a target rotation speed of the motor may be provided, the controller may control the motor at a constant speed to maintain the target rotation speed set by the rotation speed setting unit, and the duty ratio at the time of the no-load rotation set by the controller may be configured not to become zero in the vicinity of the minimum value of the smoothed DC voltage at any target rotation speed set by the rotation speed setting unit.

According to still another feature of the present invention, in the electrically powered tool, the setting unit may be set to a first setting value (a setting value which is the highest speed of the speed setting dial or a state in which a trigger switch for speed adjustment is fully drawn) at which the voltage supplied to the motor becomes a maximum value, and when the motor is driven in a state in which a load is not applied to the tip tool, a maximum value and a minimum value may be repeatedly generated so that the smoothed DC voltage is synchronized with a fluctuation of the AC voltage, and a duty ratio of PWM control may be limited to a first duty ratio smaller than 100% over both a period in which the smoothed DC voltage is in the vicinity of the maximum value and in a period in which the smoothed DC voltage is in the vicinity of the minimum value. In this way, when the setting unit is set to the first value at which the voltage supplied to the motor is a maximum value and the motor is driven in the state in which a load is not applied to the tip tool, since the duty ratio of PWM control is limited to the first duty ratio smaller than 100% over both the period in which the smoothed DC voltage is in the vicinity of the maximum value and in the period in which the smoothed DC voltage is in the vicinity of the minimum value, the current flowing from the smoothing capacitor toward the motor is suppressed and the voltage of the smoothing capacitor is hard to be lowered. Since the voltage of the smoothing capacitor is not easily lowered, a period during which the voltage output from the smoothing capacitor toward the motor is lower than an induced electromotive voltage generated by the rotation of the motor becomes shorter, and the current easily flows continuously to the motor. Therefore, the torque generated from the motor is stabilized, and the noise generated from the power transmission mechanism can be minimized. Further, since it is unnecessary to frequently switch the duty ratio, it can be realized by an inexpensive microcomputer of which a processing speed is not high, and thus an inexpensive electrically powered tool can be provided.

Advantageous Effects of Invention

According to the present invention, it is possible to provide an electrically powered tool which minimizes noise generated from a power transmission mechanism and minimizes a harmonic component contained in a current flowing through a commercial power supply.

BRIEF DESCRIPTION OF DRAWINGS

FIG. 1 is a longitudinal cross-sectional view illustrating an entire structure of an electrically powered tool 1 according to an embodiment of the present invention, wherein an arrow indicated inside the electrically powered tool 1 shows a flow of cooling air in a state in which a switch is turned on.

FIG. 6 is a table illustrating a relationship between a setting value of a speed dial 17, a target rotation speed, and a duty ratio.

DESCRIPTION OF EMBODIMENTS

First Embodiment

Figure 1:
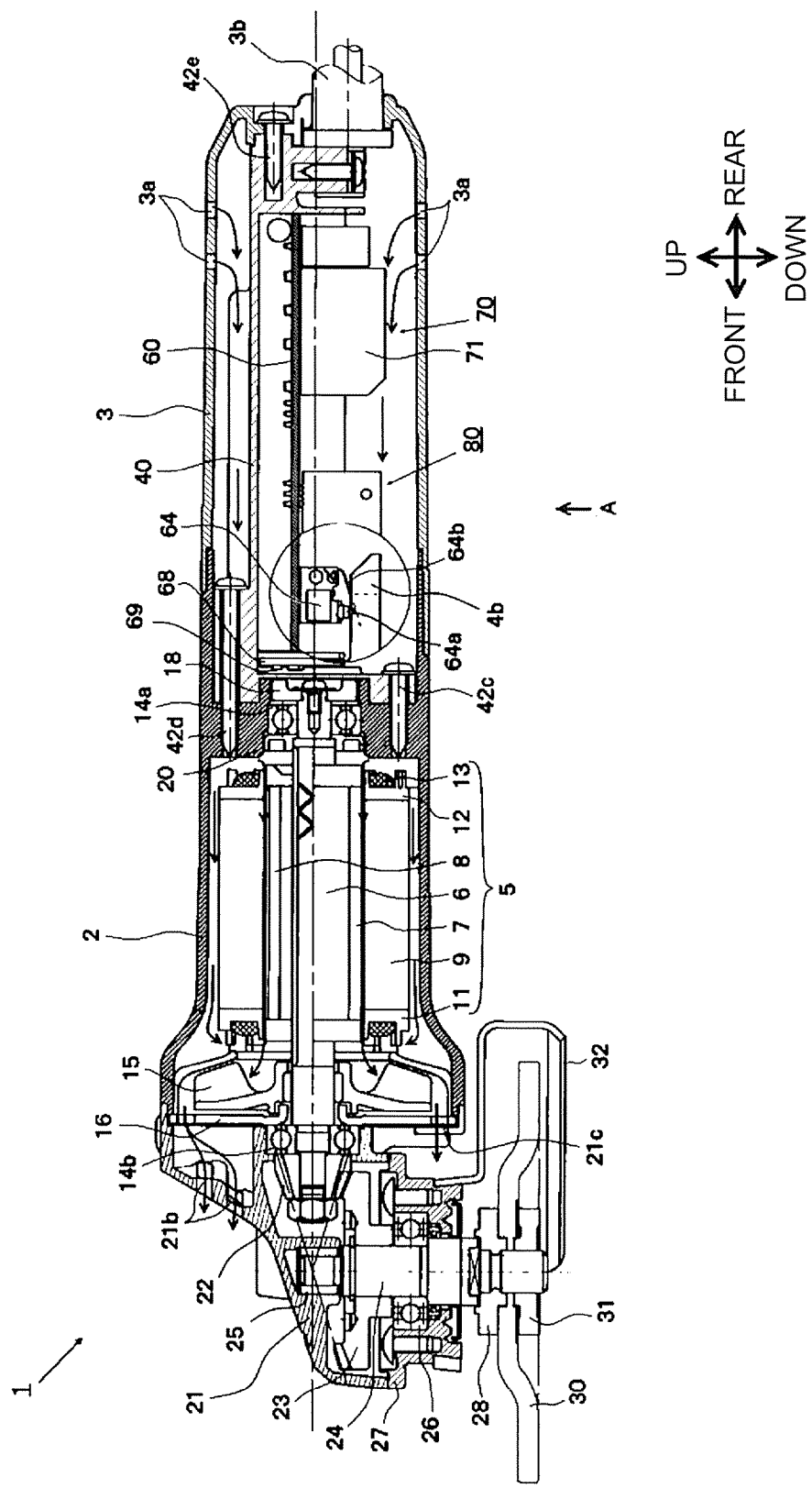

Hereinafter, embodiments of the present invention will be described with reference to the drawings. Further, in the following drawings, parts having the same function are designated by the same reference numerals, and repeated description will be omitted. Further, in the specification, it is assumed that the front, back, left, right, upward and downward directions are directions illustrated in the drawings.

FIG. 1 is a top view of an electrically powered tool 1 according to an embodiment of the present invention. Here, as an example of the electrically powered tool 1, a spindle 24 rotating in a direction orthogonal to a rotating shaft 6 of a motor 5 is provided, and working equipment connected to the spindle 24 is a disc grinder which is a circular grinding stone 30. A housing (outer frame or casing) of the electrically powered tool 1 includes three main parts of a gear case 21 which accommodates a power transmission mechanism, a cylindrical motor housing 2 which accommodates the motor 5, and a rear cover 3 which is installed at a rear of the motor housing 2 and accommodates electric devices. A method of forming the housing is arbitrary, and it may be configured with the parts divided into three in a forward and backward direction as in this embodiment, or it may be formed in other divided forms. The motor housing 2 is an integral structure formed of a resin or metal and is formed in a substantially cylindrical shape having an opening on a front side. An inner diameter of the motor housing 2 is slightly larger than an outer diameter of a stator core 9 of the motor 5, and an outer surface side of the motor housing 2 forms a portion (grip portion) which is gripped by an operator with one hand. The rear cover 3 is installed at the rear of the motor housing 2. The rear cover 3 is configured to be divisible in a leftward and rightward direction on a vertical plane passing through a longitudinal central axis (an extension line of a rotating shaft of the motor), and right and left parts are fixed by screws (not illustrated) at positions sandwiching a rear side opening of the motor housing 2. Further, an outer diameter of the rear cover 3 is substantially equal to or slightly smaller than an outer diameter of the motor housing 2.

As the rotating shaft 6 is disposed so that the motor 5 is along a central axis direction (forward and backward direction) of the motor housing 2, and a controller detects a rotational position of a rotor core 7 with a rotational position detecting element 69 formed of a Hall IC and controls an inverter circuit 80 including a plurality of switching elements Q1 to Q6 (refer to FIG. 2 described later), driving power is sequentially supplied to a predetermined coil 13 of the motor 5, and thus a rotating magnetic field is formed to rotate a rotor. The motor 5 is a three-phase brushless DC motor which is a so-called inner rotor type in which a rotor rotates within an inner circumferential side space of the stator core 9 having a substantially cylindrical shape. The stator core 9 is manufactured in a stacked structure in which a plurality of annular thin iron plates manufactured by press working are stacked in an axial direction. Six teeth (not illustrated) are formed on an inner circumference side of the stator core 9, insulators 11 and 12 formed of a resin are mounted axially in a forward and backward direction of each of the teeth, and a copper wire is wound between the insulators 11 and 12 with the teeth interposed therebetween so that a coil 13 is formed. In the embodiment, the coil 13 is preferably a star connection having three phases which are U, V and W phases, and three lead wires (not illustrated) for the U, V and W phases which supply driving power to the coil 13 are connected to a circuit board 60. The rotor core 7 is fixed to the rotating shaft 6 on an inner circumferential side of the stator core 9. The rotor core 7 is formed to be parallel to an axial direction in the rotor core in which the plurality of annular thin iron plates manufactured by press working are stacked in the axial direction, and a plate-shaped permanent magnet 8 having an N pole and an S pole is inserted into a slot portion having a rectangular cross section.

The rotating shaft 6 is rotatably held by two bearings 14a and 14b. A cooling fan 15 is provided between the bearing 14b and the motor 5 when seen in an axial direction of the rotating shaft 6. The cooling fan 15 is, for example, a centrifugal fan formed of a plastic that rotates in synchronization with the rotating shaft 6 when the motor 5 rotates and generates a wind flow (cooling air) for cooling the motor 5, a control circuit, and so on in a direction indicated by a plurality of black arrows inside the housing. The cooling air is suctioned from an intake port 3a provided in upper and lower surfaces of the rear cover 3 in the vicinity of a rear end of the circuit board 60, flows around the case 40 accommodating the circuit board 60 from a rear side to a front side, passes through an opening (not illustrated) provided in a bearing holder portion 20 of the motor housing 2, and flows into an accommodation space of the motor 5. The cooling air which has flowed into the accommodation space of the motor 5 is suctioned by the cooling fan 15 through a gap (refer to a black arrow in the drawing) between the motor housing 2 and an outer circumferential side of the stator core 9 or an inner space of the stator core 9, passes through a through-hole of a fan cover 16, and is discharged from a through-hole 21b of the gear case 21 to a front side or discharged forward from a through-hole 21c on a lower side of the fan cover 16. In the embodiment, the circuit board 60, a sensor magnet 18, the bearing 14 a, the motor 5, the cooling fan 15, and the bearing 14b are arranged in series (on a straight line) in the axial direction from a rear side (windward side) to the front side when seen on an axis line of the rotating shaft 6 of the motor 5. Additionally, the intake port 3a serving as an air window for suctioning external air is disposed on a rear side of elements having large heat generation around the circuit board 60, particularly, a rectifier circuit 71 and the switching elements Q1 to Q6 (refer to FIG. 2 to be described later). In this way, in the embodiment, the cooling air flows to be substantially in contact with an entire outer circumferential surface of the housing from a rear side to a front side when seen in a direction of a rotating shaft of the motor 5.

The gear case 21 is formed by integral molding of a metal, for example, aluminum, accommodates a pair of bevel gear mechanisms 22 and 23, and rotatably holds the spindle 24 which is an output shaft. The spindle 24 is disposed to extend in a direction (here, vertical direction) substantially orthogonal to the axial direction (here, forward and backward direction) of the rotating shaft of the motor 5, a first bevel gear 22 is provided at a front end portion of the rotating shaft 6, and the first bevel gear 22 engages with a second bevel gear 23 installed at an upper end of the spindle 24. Since a diameter of the second bevel gear 23 is large and the number of gears is greater than that of the first bevel gear 22, these power transmission mechanisms act as deceleration units. An upper end side of the spindle 24 is pivotally supported on the gear case 21 to be rotatable by a metal 25, and an approximately central portion thereof is supported by a bearing 26 formed of a ball bearing. The bearing 26 is fixed to the gear case 21 via a spindle cover 27.

An installation base 28 is provided at a distal end of the spindle 24, and a tip tool such as the grinding stone 30 is mounted by a washer nut 31. The grinding stone 30 is, for example, a resinoid flexible grinding stone, a flexible grinding stone, a resinoid grinding stone, a sanding disk, or the like which has a diameter of 100 mm and is capable of performing surface polishing and curved surface polishing of metals, synthetic resins, marble, concrete and so on by selecting a type of abrasive grain to be used. A radially outer side and an upper side of the grinding stone 30 on a rear side thereof are covered with a wheel guard 32. Further, the tip tool which is installed at the electrically powered tool 1 is not limited to only the grinding stone 30, but other tools such as a bevel wire brush, a nonwoven fabric brush, a diamond wheel and so on may be installed.

The sensor magnet 18, which is a magnetic body having different magnetic poles in a rotation direction, is installed at a rear end of the rotating shaft 6 of the motor 5. The sensor magnet 18 is a thin cylindrical permanent magnet installed to detect the rotational position of the rotor core 7, and NSNS poles are sequentially formed at intervals of 90 degrees in a circumferential direction. A substantially semi-circular sensor board 68 disposed in a direction perpendicular to the rotating shaft 6 is provided on an inner side of the case 40 located on a rear side of the sensor magnet 18, and a rotational position detecting element 69 which detects a position of the sensor magnet 18 is provided on the sensor board 68. The rotational position detecting element 69 detects the rotational position of the rotor core 7 by detecting a change in a magnetic field of the sensor magnet 18 which is rotating and three rotational position detecting elements 69 are provided in the rotation direction at predetermined angular intervals, here, at intervals of 60°.

The controller (to be described later) for controlling the rotation of the motor 5, the inverter circuit 80 for driving the motor 5 and a power supply circuit 70 for converting an alternating current supplied from the outside through a power cord 3b into a direct current are accommodated inside the rear cover 3 formed in a substantially cylindrical shape. In the embodiment, these circuits are mounted on the common circuit board 60. The circuit board 60 is disposed to be parallel to a longitudinal central axis (which is coaxial with the rotating shaft 6 of the motor 5) of the electrically powered tool 1. Here, a front surface and a back surface of the board are disposed to extend in the forward and backward direction and the leftward and rightward direction. The circuit board 60 is disposed inside a substantially rectangular parallelepiped container-shaped case 40 of which one surface is formed as an opening, and the case 40 is screwed to the bearing holder portion 20 of the motor housing 2 by screws 42c and 42d. Further, a rear end side of the case 40 is fixed to the rear cover 3 by a screw 42e. An inside of the case 40 is totally solidified with a hardening resin which hardens a liquid resin (not illustrated). Here, when the grinding stone 30 of the electrically powered tool 1 is on a lower side (in a direction of FIG. 1), the opening of the case 40 faces downward, and the plurality of switching elements Q1 to Q6 (described later) included in the inverter circuit 80 are disposed to extend downward from the circuit board 60. About half of the switching elements Q1 to Q6 on the side close to the circuit board 60 are located inside the resin and about remaining half are not covered with the resin but are exposed to the outside.

In the inverter circuit 80, it is necessary to apply a large drive current to the coil 13, and thus, for example, large capacity output transistors such as a field effect transistor (FET) and an insulated gate bipolar transistor (IGBT) are used as the switching elements Q1 to Q6. A metal plate for cooling is further installed on a heat sink plate of the switching elements Q1 to Q6. A power supply circuit is provided on a rear side of the switching elements Q1 to Q6. The power supply circuit 70 of the embodiment is configured to include a rectifier circuit for converting a commercial power supply (AC) supplied from the outside into DC. The power supply circuit 70 is mounted on a position close to the power cord 3b wired to extend outward from a rear end surface of the rear cover 3, that is, on a rear side of the case 40 according to efficiency of wiring.

A switch 64 for turning on or off the motor 5 is provided in the vicinity of the inverter circuit 80. In a circle in the drawing, a part of the switch 64 is illustrated in a perspective view. The switch 64 has a plunger 64a and a metal leaf spring 64*b* for pressing the plunger 64*a*, and as a contact portion 4*b* which moves in conjunction with a switch operating portion described later in FIG. 2 deforms the leaf spring 64*b*, the switch 64 is turned on. FIG. 1 illustrates a state in which the plunger 64*a* is not pushed. When the contact portion 4*b* moves forward from the state of FIG. 1, the switch 64 is turned on.

Figure 2:
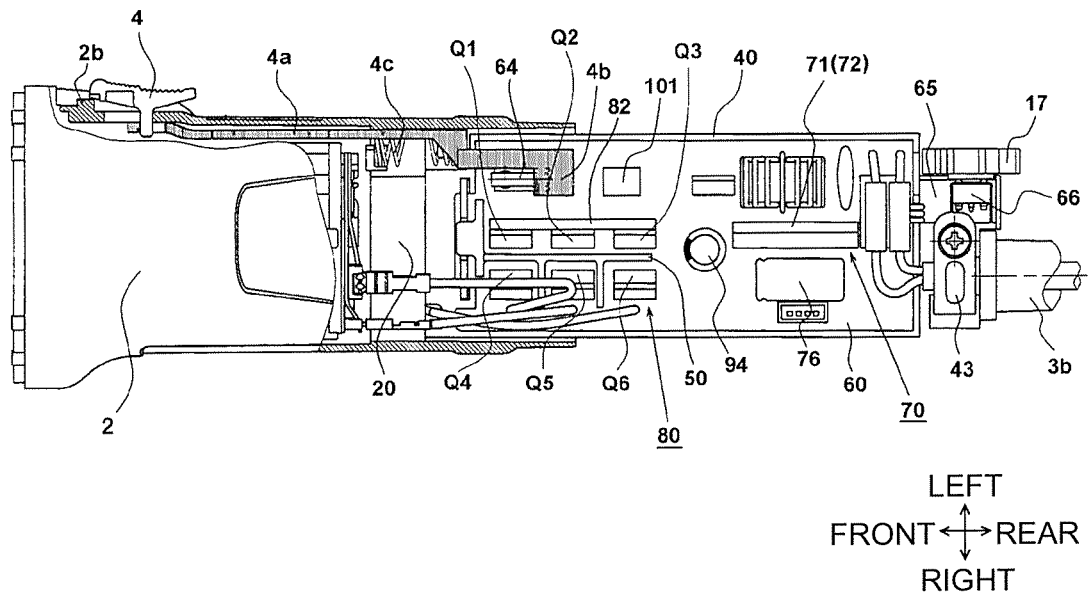
FIG. 2 is a view of a rear portion of FIG. 1 seen from a direction A, which illustrates a case 40 and a circuit board 60.

FIG. 2 is a view of a rear half of FIG. 1 when seen from a direction of an arrow A, and illustrates the case 40 and the circuit board 60. The drawing illustrates a state in which the rear cover 3 is removed from the motor housing 2. A shape of the circuit board 60 accommodated inside the case 40 is formed to have an outer contour approximately equal to an inner shape of the case 40. Although not illustrated in the drawing, the circuit board 60 is immersed in more than half of a space in a container by a resin which is hardened and solidified from a liquid state. On the circuit board 60, the power supply circuit 70 mainly configured with a rectifier circuit 71 consisting of a diode bridge 72 and a smoothing circuit including an electrolytic capacitor 76, the inverter circuit 80 including the six switching elements Q1 to Q6, a controller which controls the inverter circuit 80 and includes a microcomputer 101, and a constant voltage power supply circuit (not illustrated) for generating a DC constant voltage for the controller are mainly mounted. The power cord 3*b* is connected from the outside of the electrically powered tool 1 to an input side of the circuit board 60, and a commercial AC power is input to the power supply circuit 70. The power cord 3*b* is fixed by a power cord holding portion 43. The switch 64 is disposed on a right side of the inverter circuit 80. A switch operating portion 4 for turning on or off the rotation of the motor 5 is provided on a left side surface of the motor housing 2. The switch operating portion 4 is connected to the vicinity of a front end of a switch bar 4*a* which is movable in the axial direction and is formed to be slidable in the forward and backward direction of the motor housing 2. A protruding portion 2*b* is formed on the motor housing 2 and engages with a recessed portion of the switch operating portion 4, and thus a so-called on-lock mechanism which holds the motor 5 in an ON state is realized. A contact portion 4*b* for deforming the leaf spring 64*b* (refer to FIG. 1) of the switch 64 is provided at a rear end portion of the switch bar 4*a*, and the switch bar 4*a* is biased toward the rear side (a direction in which the switch 64 is turned off) by a compression spring 4*c*.

The inverter circuit 80 is disposed so that sets of three switching elements Q1 to Q3 and Q4 to Q6 are arranged in lines in the axial direction. In the switching elements Q1 to Q6, semiconductor elements are enclosed in a substantially rectangular parallelepiped package formed of a ceramic or the like, three metal terminals extend from a lower side of the package, and a heat sink plate formed of metal is embedded in a back side of the package. The heat sink plate has a planar shape, and the switching elements Q1 to Q6 are arranged so that a spreading direction of the plane is parallel or orthogonal to a longitudinal direction (forward and backward direction in FIG. 2) of the circuit board 60. Further, a metal plate 82 for radiating heat is further provided on the heat sink plate located on a rear surface of the package. Typically, since a collector terminal of the IGBT and a drain terminal of the FET are electrically connected to the heat sink plate on the rear surface side of the package, in the circuit configuration, the common metal plate 82 is provided in the plurality of switching elements Q1 to Q3 when the collector terminal or the drain terminal is connected in common. On the other hand, the remaining three switching elements Q4 to Q6 of the inverter circuit 80 are arranged in a line to be parallel to the switching elements Q1 to Q3. The metal plates for radiating heat are provided on the heat sink plate located on the rear surface of the package of the switching elements Q4 to Q6, but since the collector terminals or the drain terminals thereof are not connected in common, the metal plates are provided independently.

The microcomputer (microcomputer) 101 constituting the controller for further controlling the rotation of the motor 5 is mounted on the circuit board 60. The microcomputer 101 activates and stops the motor 5 and controls a rotation speed thereof by driving the inverter circuit 80. A constant voltage power supply circuit to be described later is further mounted on the circuit board 60. These elements can be mounted in an arbitrary space on the circuit board 60. In the embodiment, the microcomputer 101 is mounted on a rear side of the switch 64. The sensor board 68 on which three rotational position detecting elements 69 (refer to FIG. 1) are mounted is disposed on a front side of the circuit board 60 to be orthogonal to the circuit board 60. The circuit board 60 and the sensor board 68 are fixed by a partition member 50. The partition member 50 serves as a fixing member for holding the circuit board 60 on the case 40 and also serves as a partitioning member for providing a partition plate for minimizing short circuit between the switching elements Q1 to Q6. A switch board 65 on which a variable resistor 66 is mounted is provided on the rear side of the case 40. The switch board 65 is provided on an independent portion which protrudes rearward from a container-shaped portion of the case 40, and a speed dial 17 which is partially exposed from a rear wall surface of the rear cover 3 is provided on a rotating shaft of the variable resistor 66.

Figure 3:
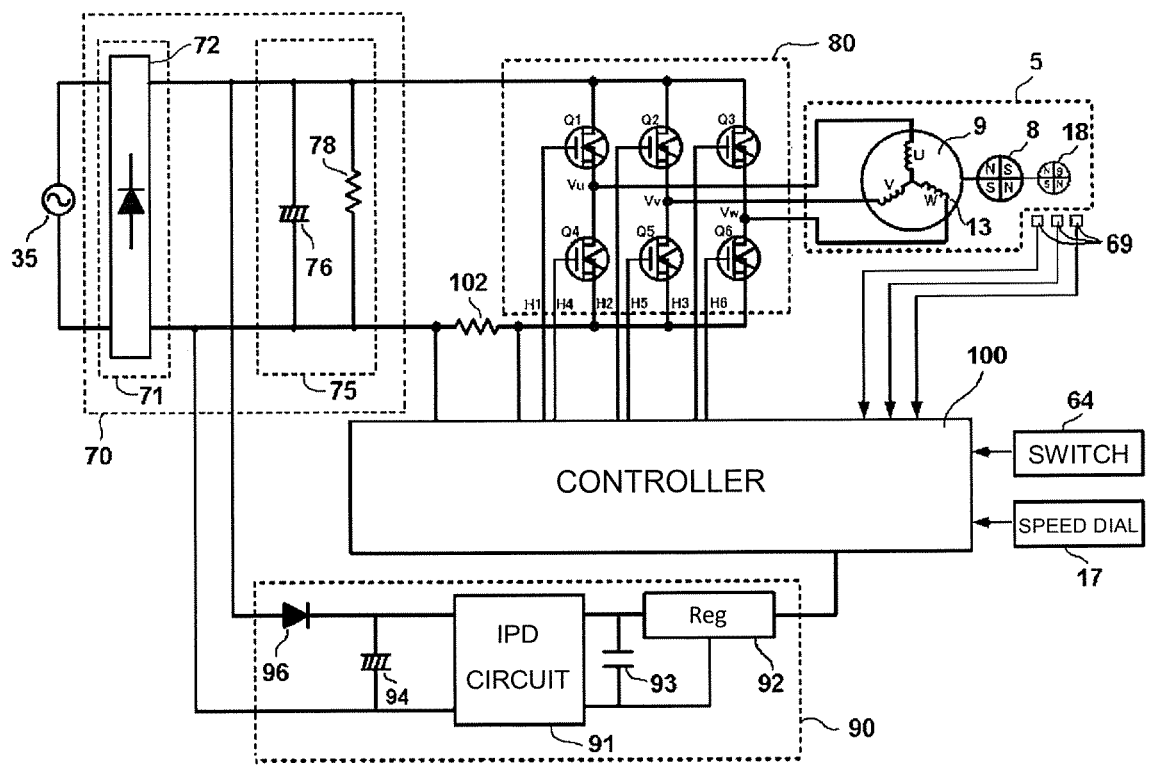
FIG. 3 is a block diagram illustrating a circuit configuration of a drive control system of a motor 5 in FIG. 1.

Next, a circuit configuration of a drive control system of the motor 5 will be described with reference to FIG. 3. The power supply circuit 70 is configured with the rectifier circuit 71 and a smoothing circuit 75. Here, the rectifier circuit 71 is configured by the diode bridge 72. The smoothing circuit 75 is connected between an output side of the rectifier circuit 71 and the inverter circuit 80. The smoothing circuit 75 includes the electrolytic capacitor 76 for reducing a pulsation state of a DC voltage and a resistor 78 for discharging. The inverter circuit 80 includes the six switching elements Q1 to Q6, and a switching operation is controlled by gate signals H1 to H6 supplied from the controller 100. An output of the inverter circuit 80 is connected to the U phase, the V phase and the W phase of the coil 13 of the motor 5. A constant voltage power supply circuit 90 is connected to the output side of the rectifier circuit 71.

An input side of the rectifier circuit 71 is connected to, for example, a commercial AC power supply 35, full-wave rectifies an input AC and outputs it to the smoothing circuit 75. The smoothing circuit 75 smoothes a pulsating flow included in the current rectified by the rectifier circuit 71 as much as possible and outputs it to the inverter circuit 80. When the electrically powered tool 1 is a disc grinder, a large output is required as compared with other electrically powered tools (for example, an impact driver, or the like), and thus a voltage value input to the smoothing circuit 75 from the power supply circuit 70 is also high. For example, when the input voltage is 230 V AC, a peak thereof is about 324 V.

The inverter circuit 80 is configured to include six switching elements Q1 to Q6 connected in a three-phase bridge type. Here, the switching elements Q1 to Q6 are insulated gate bipolar transistors (IGBTs), but metal oxide semiconductor field effect transistors (MOSFETs) may also be used.

The rotor having the permanent magnet 8 rotates inside the stator core 9 of the motor 5. The sensor magnet 18 for position detection is connected to the rotating shaft 6 of the rotor, and the controller 100 detects the rotational position of the motor 5 by detecting a position of the sensor magnet 18 with the rotational position detecting element 69 such as a Hall IC or the like.

The controller 100 is a means for controlling on/off and rotation of the motor and is configured to include the microcomputer 101 (refer to FIG. 2). The controller 100 is mounted on the circuit board 60, sets the rotation speed of the motor 5 on the basis of a start signal input in accordance with an ON operation of the switch 64 and an output signal of the variable resistor 66 set by the speed dial 17, and controls an energizing time and a driving voltage to the U, V and W phases of the coil 13 to rotate constantly the motor 5 at a setting rotation speed. The signals (driving signals H1 to H6) from the controller 100 are connected to gates of the six switching elements Q1 to Q6 of the inverter circuit 80 and are used for on/off control of each of the switching elements Q1 to Q6. Each of drains or sources of the six switching elements Q1 to Q6 of the inverter circuit 80 is connected to the U phase, the V phase and the W phase of the star-connected coil 13. On the other hand, the drain terminals of the switching elements Q4 to Q6 are connected to the V-phase, U-phase and W-phase terminals of the motor, respectively.

The switching elements Q1 to Q6 perform the switching operation on the basis of the driving signals H1 to H6 input from the controller 100 and supply the DC voltages supplied from the commercial AC power supply 35 via the rectifier circuit 71 and the smoothing circuit 75 to the motor 5 as three-phase (U-phase, V-phase and W-phase) voltages Vu, Vv and Vw. A magnitude of the current supplied to the motor 5 is detected by the controller 100 detecting a voltage value at both ends of a current detecting resistor 102 connected between the smoothing circuit 75 and the inverter circuit 80. A predetermined current threshold value according to setting rotation of the motor 5 is preset in the controller 100, and when the detected current value exceeds the threshold value, the driving of the motor 5 is stopped, and thus the switching operation of the inverter circuit 80 is stopped. Accordingly, occurrence of burning or the like due to an overcurrent flowing to the motor 5 is prevented.

The constant voltage power supply circuit 90 is a power supply circuit which is directly connected to the output side of the rectifier circuit 71 and supplies a direct current of a stabilized reference voltage (low voltage) to the controller 100 configured with the microcomputer or the like. The constant voltage power supply circuit 90 includes a diode 96, an electrolytic capacitor 94 for smoothing, an IPD circuit 91, a capacitor 93 and a regulator 92. Each part of the constant voltage power supply circuit 90 is mounted on the circuit board 60, although this is not illustrated in FIG. 2 except for the electrolytic capacitor 94.

Figure 4:
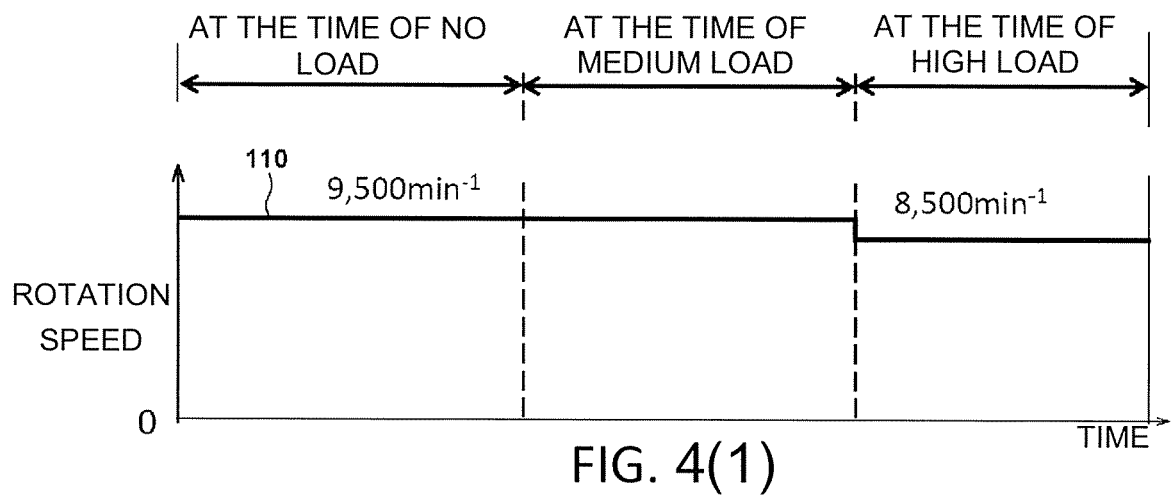
FIG. 4(1) to FIG. 4(4) are diagrams illustrating a relationship among a spindle rotation speed, a duty ratio of PWM, an output voltage from a smoothing circuit, and a current applied to and flowing through the motor 5 in the electrically powered tool 1 of FIG. 1.
Figure 4:
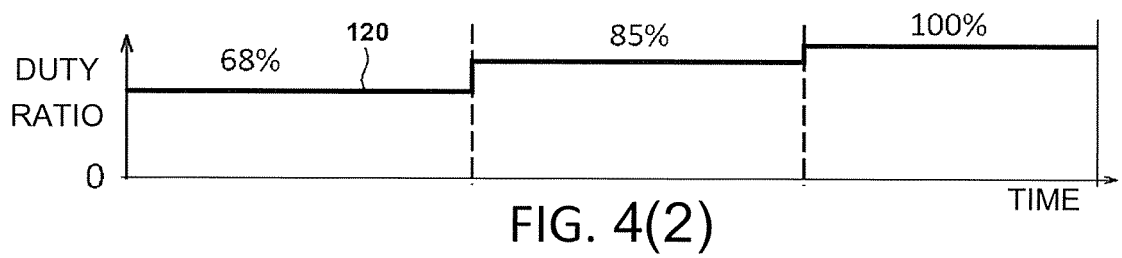
Figure 4:
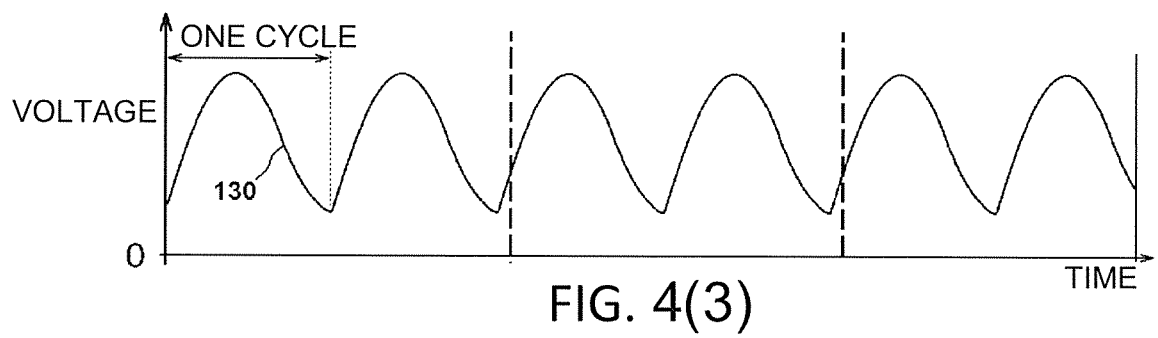
Figure 4:
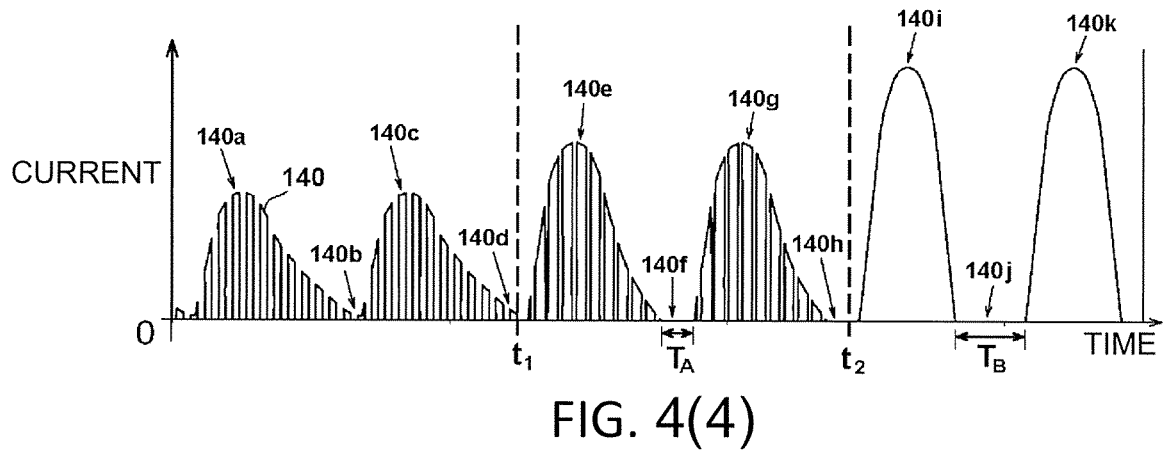

FIG. 4(1) to FIG. 4(4) are diagrams illustrating a relationship between the voltage and the current applied to the motor 5 and illustrating a state in which the speed dial 17 serving as a rotation speed setting unit for setting a target rotation speed of the motor 5 is set to "dial 1" having the highest rotation speed. A horizontal axis is time (units of milliseconds), and the time on the horizontal axis of each of FIG. 4(1) to FIG. 4(4) is illustrated together to be aligned. Vertical axes represent a rotation speed of the spindle 24, a duty ratio of PWM control, a motor voltage and a motor current. Here, the motor 5 rotates when the switch 64 is turned on, and the motor 5 rotates in a no-load state between time 0 and time t1. A medium load is applied to the motor 5 by lightly pressing the grinding stone 30 against a material to be polished at time t2, and after time t2, a state in which it further rotates under the highest load condition due to the pressing on the material to be polished, a state of the material to be polished, or the like is shown. Incidentally, a portion of an acceleration process immediately after the motor starts is not illustrated. For the sake of explanation, it is assumed that the load switches in stages with no load, medium load, and high load (in an actual grinding operation, a magnitude of the load varies from moment to moment according to a strength with which the grinding stone is pressed, a rigidity or a state of the contact portion of a workpiece, a type of the grinding stone, and so on). Here, the no-load rotation is a state of rotation in a state in which the motor 5 is rotated in a workable state in which a tip tool is installed at the electrically powered tool but the tip tool is not in contact with a workpiece or the like at all. Further, a load under the no-load state may be slightly different according to a type of the tip tool to be installed.

In FIG. 4(1), a spindle rotation speed 110 is maintained at 9500 $min^{-1}$ from the no-load to the medium load. A duty ratio 120 at this time is 68% and 85%, as illustrated in FIG. 4(2). At the time of the high load, the duty ratio 120 becomes 100% and the motor 5 is in a full power state, but since the load is large, for example, it decreases to 8500 $min^{-1}$. FIG. 4(3) illustrates an output voltage 130 of the smoothing circuit 75. Since the output voltage 130 is full-wave rectified by the diode bridge 72, it pulsates at a frequency twice a frequency of an input AC voltage. FIG. 4(4) illustrates a current waveform flowing in the motor 5 at this time. A current value 140 flowing through the motor 5 is adjusted by pulse width modulation (PWM) control of the switching elements Q1 to Q6. Since the duty ratio is set as low as 68% in the no-load rotation, a line connecting peak positions of the waveform varies to have maximum values 140a and 140c and minimum values 140b and 140d which substantially correspond to the output voltage 130. In the minimum values 140b and 140d, there is no section in which the line connecting the peak positions becomes zero, and the current does not become zero but continuously flows when the pulsating direct current is the minimum. Here, the term "continuously" indicates a state when viewed from the line connecting the peak positions of the waveform while an intermittent state within a period of one cycle of a second frequency switched for the PWM control is ignored, in other words, when viewed from a first frequency as a reference.

At the time of the medium load, since the duty ratio is set higher and becomes, for example, 85%, peak positions (arrows 140e and 140g) of the line connecting the peak positions of the waveform of the current value 140 become high. Meanwhile, since there is a time $T_A$ during which no current flows at arrows 140f and 140h as the minimum values, the current flows intermittently to the motor 5. Here, the term "intermittently" refers not to the intermittent state within a period of one cycle of the second frequency switched for the PWM control but to a state at the first frequency as viewed from the line connecting the peak positions of the waveform. At the time of the high load, since the duty ratio is set higher and becomes 100%, there is no OFF period of the PWM control. At this time, a peak value of the current value 140 increases as indicated by arrows 140i and 140k, and a time $T_B$ during which the current does not flow is elongated as indicated by an arrow 140j.

In the embodiment, the PWM duty ratio of the switching element is reduced so that the smoothed direct current supplied to the switching element pulsates at a frequency twice the frequency of the input commercial power and there is no current zero section when the pulsating direct current is the minimum. As a result, even in the vicinity of the minimum values 140b and 140d in the no-load operation, there is no section in which the current becomes zero, that is, a zero current section for one cycle or more of the PWM control frequency (second frequency), and an effective value of the current can be maintained above zero. Since the driving force of the motor 5 is not lost due to such control, it is possible to continue the rotation while maintaining the contact state without repeating separation and contact between gears, and thus it is possible to prevent generation of the sound due to hitting of the gears. Further, at the time of the medium load or the high load, there are sections (times $T_A$ and $T_B$) in which the current becomes zero like the minimum values 140f, 140h and 140j, but when the motor 5 is driven in a state in which a load is applied to the tip tool, the noise generated between the tip tool and a material to be processed commonly becomes larger than the noise generated from the power transmission mechanism, and at this time, a worker does not feel a great discomfort for the noise generated from the power transmission mechanism.

Figure 5:
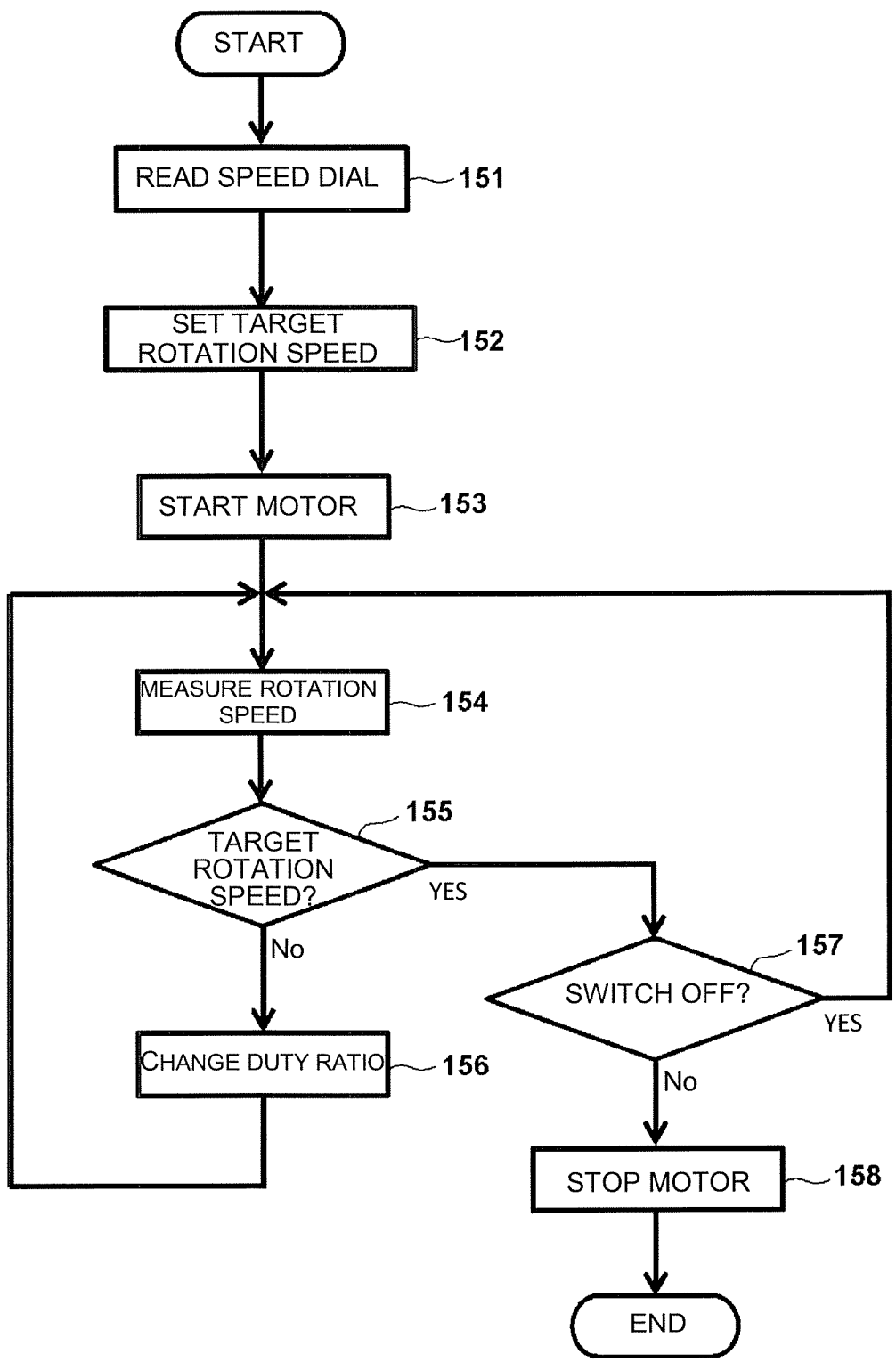
FIG. 5 is a flowchart illustrating a control procedure of a motor according to the embodiment.

FIG. 5 is a flowchart illustrating a procedure of current control in the motor 5. A series of procedures illustrated in FIG. 5 can be performed by software in accordance with a program stored in advance in the microcomputer 101 of the controller 100. When the worker turns on the switch bar 4a, control of the procedure of FIG. 4(1) to FIG. 4(4) starts. First, the microcomputer 101 reads a setting position of the speed dial 17 (Step 151). Next, the microcomputer 101 determines the target rotation speed of the motor 5 corresponding to the speed dial 17 (Step 152). FIG. 6 is a diagram illustrating a relationship among a dial setting value 191 of the speed dial 17, a setting rotation speed 192 of the spindle 24, and a duty ratio 193 in the no-load rotation. In the electrically powered tool 1, constant speed control of the motor 5 is performed so that the setting rotation speed 192 corresponds to the dial setting value 191. Here, the setting rotation speed 192 of the spindle 24 is set from 2800 min$^{-1}$ to 9500 min$^{-1}$ to correspond to dials 1 to 6. The relationship between the dial setting value 191 and the setting rotation speed 192 is preferably registered in advance in a nonvolatile memory region of the microcomputer 101.

Returning to FIG. 5, when the target rotation speed is determined in Step 152, the microcomputer 101 starts the motor 5 (Step 153). The motor 5 softly starts in accordance with a predetermined control procedure. Next, the microcomputer 101 measures the rotation speed of the motor 5 from an output of the rotational position detecting element 69 (Step 154) and determines whether the rotation speed of the motor 5 reaches or maintains the target rotation speed (Step 155). The microcomputer 101 increases a set duty ratio when the target rotation speed is not reached in Step 155 and the rotation speed of the motor is low, changes the duty ratio by increasing the setting duty ratio when the rotation speed of the motor is low, and returns to Step 154 (Step 156). In Step 155, when the rotation speed of the motor 5 is the target rotation speed, the microcomputer 101 detects whether or not the switch 64 is turned off (Step 157), returns to Step 154 when it is not turned off, stops the rotation of the motor 5 when it is turned off, and ends the processing (Step 158).

As described in the flowchart of FIG. 5, the motor 5 is started, and the duty ratio of the PWM is gradually increased to reach the target rotation speed. Then, the constant speed control is performed to maintain the target rotation speed. When the target rotation speed is reached, the duty ratio is approximately 68% at "dial 6" and is approximately 10% at "dial 1." Therefore, in the state of "dial 6," when the no-load operation is continued, the duty ratio becomes almost constant at 68%.

Figure 7:
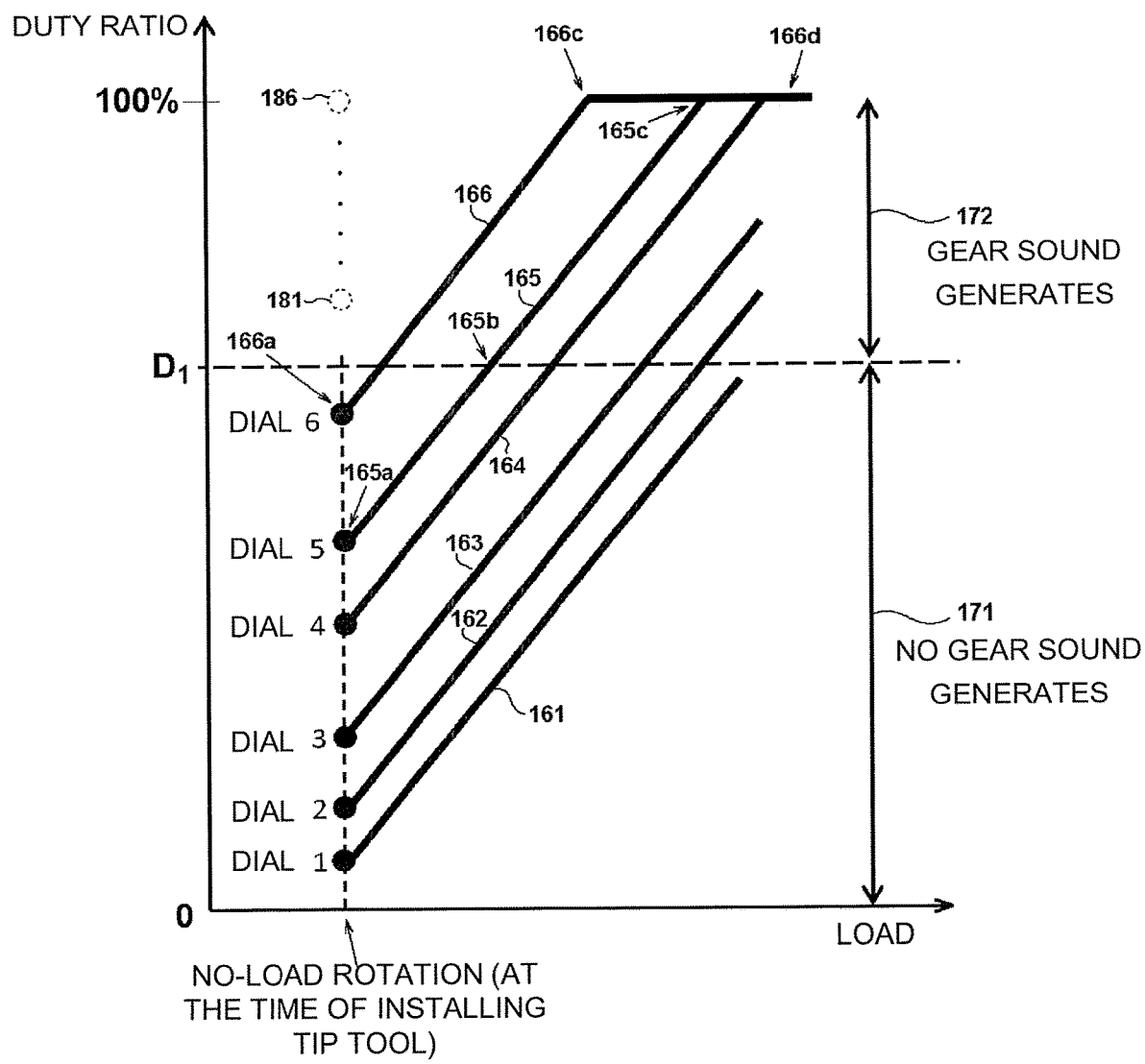
FIG. 7 is a diagram illustrating a relationship among a magnitude of a load for each setting value of the speed dial 17 and a setting duty ratio.

FIG. 7 is a diagram illustrating a relationship between the magnitude of the load for each setting value of the speed dial 17 and the setting duty ratio. A horizontal axis is the magnitude of the load applied to the motor 5, and a vertical axis is the duty ratio of the PWM control of the switching elements Q1 to Q6. In the electrically powered tool 1 of the embodiment, the speed dial 17 can be set in six stages with setting values from 1 to 6, and a magnitude of the voltage which is supplied to the motor 5 is set so that the rotation speed of the spindle 24 at each setting value varies from 2800 to 9500 rpm. Then, when the load applied to the tip tool gradually increases from the no-load state and the rotation speed of the motor is about to decrease, the duty ratio is controlled to be increased by the constant speed control due to the microcomputer 101, such that the target rotation speed is maintained.

The duty ratios 161 to 166 in the no-load operation, that is, the case in which the grinding stone 30 is rotated in a state in which it is not in contact with anything, are as indicated by the black circles, and when work is started by pressing the grinding stone 30 against a workpiece from that state, the load increases, and thus the controller 100 increases the duty ratios 161 to 166 to keep the setting rotation speed 192 (refer to FIG. 6). For example, at "dial 5," a duty ratio of an arrow 165a is 47% in the no-load rotation, but the duty ratio is increased as the load increases, exceeds a first threshold value $D_1$ at the time of an arrow 165b, and increases to a position of 100% indicated by an arrow 165c. When the duty ratio becomes 100%, it cannot be increased any further, and thus it is rotated while maintaining 100%. Further, in a low speed rotation mode like the dials 1 and 2, the duty ratios 161 and 162 are increased as the load rises from the duty ratios 161 and 162 at the no-load, but the setting rotation speed can be maintained without increasing the duty ratios 161 and 162 to 100%.

In the embodiment, the duty ratios 161 to 166 at the time of the no-load rotation are set to be lower than the first threshold (first duty ratio) $D_1$ in any of the dials 1 to 6. When the duty ratio at the time of the no-load rotation is lower than the first threshold value $D_1$, a section in which the current becomes zero in the vicinity of the minimum value of the current value (for example, a section like time $T_A$ and $T_B$ in FIG. 4(4)) does not occur, and thus no problem of the sound occurs. A region in which the duty ratio is less than $D_1$ is a range 171 in which a gear sound is not generated from the power transmission mechanism, and a region in which the duty ratio is equal to or larger than $D_1$ is a range 172 in which the gear sound is generated from the power transmission mechanism. Since the control of the embodiment can be easily realized by changing characteristics of the motor 5 (the number of turns of the windings or the like) from a conventional one and changing parameters of the PWM control by the microcomputer 101, there is almost no increase in cost for realizing the embodiment, and an inexpensive electrically powered tool can be provided. Further, since the first threshold value $D_1$ which is a minimum duty ratio at which the minimum value of the current becomes zero at the no-load rotation varies according to a voltage of the commercial AC power supply, a size of the capacitor in the smoothing circuit, characteristics of the motor or the power transmission mechanism to be used, and a type of the tip tool, the first threshold value $D_1$ may be obtained at the time of designing the electrically powered tool so that all the duty ratios indicated by black circles are set to be smaller than the first threshold value $D_1$.

Dotted circles 181 and 186 in FIG. 7 are examples of duty ratios at the time of the no-load rotation in the conventional electrically powered tool. In a method of controlling the conventional electrically powered tool, an output of the motor is increased by winding many windings of the motor, and it is controlled only in a region in which the duty ratio is high. Therefore, the duty ratio at the time of the no-load rotation is already higher than the first threshold value $D_1$. Therefore, in the embodiment, the number of windings of the motor is reduced so that the rotation speed is faster than in a conventional one and a speed reduction ratio of a deceleration mechanism is larger than in a conventional one. In other words, it is operated in a state in which the duty ratio is lowered using a motor with an output higher than that of a conventional motor. In this way, over both the period in which the DC voltage smoothed in the no-load state is in the vicinity of the maximum value and the period in which the smoothed DC voltage is in the vicinity of the minimum value, the duty ratio of the PWM control is limited to less than the first threshold value $D_1$ which is smaller than 100%, and thus it is possible to realize an electrically powered tool which rotates smoothly with low noise during the no-load rotation.

Although the present invention has been described on the basis of embodiments, the present invention is not limited to the above-described embodiments, and various modified examples are possible without departing from the spirit of the invention. For example, in the above-described embodiments, a disc grinder is used as an example of the electric power tool, but the present invention is not limited to the disc grinder, and it can be applied to any tool having a gear in the power transmission mechanism using a motor of which rotation is controlled by a switching element as a power source. Further, a type of the tool is not limited to only the grinding stone, and it can be similarly applied to any tool having the no-load rotation state in which the motor is rotated without pressing the tool against an object, such as a drill using a drill blade, a circular saw using a saw tooth, an electric chain saw, a grass cutter using a mowing blade, a hedge trimmer using a reciprocating blade, and so on. In addition, the setting unit for setting the rotation speed of the motor 5 is not limited to only the speed setting dial, but a trigger mechanism using a variable switch of which rotation speed of a motor varies according to a pulling amount may be used.

The invention claimed is:

1. An electrically powered tool comprising:
    a rectifier circuit configured to rectify an AC voltage supplied from a commercial power supply to a pulsating DC voltage,
    a smoothing circuit having a smoothing capacitor configured to reduce a pulsation state of the pulsating DC voltage,
    a circuit configured to supply a DC voltage smoothed by the smoothing circuit to a motor, and
    a tip tool configured to be driven by the motor,
    wherein a current continuously flows to the motor when the motor is driven in a state in which no load is applied to the tip tool, and in a state in which a load is applied to the tip tool, when the load applied to the tip tool is increased, the current flowing to the motor becomes intermittent.

2. The electrically powered tool according to claim 1, further comprising a power transmission mechanism, wherein the power transmission mechanism comprises a deceleration mechanism using a plurality of gears.

3. The electrically powered tool according to claim 1, further comprising:
    a switching element provided between the smoothing circuit and the motor and configured to control the DC voltage supplied to the motor; and
    a controller configured to control rotation of the motor by driving the switching element,
    wherein the controller is configured to control the switching element so that, in a case in which the motor is rotated in a state in which no load is applied to the tip tool, the current continuously flows to the motor.

4. The electrically powered tool according to claim 3, wherein the circuit comprises an inverter circuit, the inverter circuit is formed using a plurality of switching elements and provided between the smoothing circuit and the motor, and
    the controller is configured to control the inverter circuit during no-load rotation of the motor so that the current continuously flows to the motor.

5. The electrically powered tool according to claim 3, further comprising a rotation speed setting unit connected to the controller to set a rotation speed of the motor,
    wherein regardless of a rotation speed set by the rotation speed setting unit, an effective value of a minimum value of the current is maintained at greater than zero during no-load rotation.

6. The electrically powered tool according to claim 1, wherein a capacity of the smoothing capacitor is set such that there is a section in which a minimum value of an effective value of the current at the time of a load in which work on a workpiece is performed by the tip tool becomes zero.

7. The electrically powered tool according to claim 1, further comprising
    a controller configured to control a rotation speed of the motor,
    wherein the controller is configured to control the motor at a constant speed to maintain a set rotation speed, and
    a duty ratio at the time of no-load rotation set by the controller is set not to become zero even in the vicinity of a minimum value of the DC voltage.

8. The electrically powered tool according to claim 7, further comprising a rotation speed setting unit configured to set a target rotation speed of the motor,
    the controller is configured to control the motor at a constant speed to maintain the target rotation number set by the rotation speed setting unit, and
    the duty ratio at the time of the no-load rotation set by the controller is configured not to become zero in the vicinity of the minimum value of the DC voltage at any target rotation speed set by the rotation speed setting unit.

9. The electrically powered tool according to claim 1, further comprising:
    a switching element provided between the smoothing circuit and the motor and configured to control the DC voltage supplied to the motor,
    a controller connected to the switching element and configured to PWM-control the switching element, and
    a setting unit connected to the controller and operated to control the DC voltage supplied to the motor,
    wherein the setting unit is set to a first setting value at which the DC voltage supplied to the motor becomes a maximum value, and
    when the motor is driven in a state in which a load is not applied to the tip tool, a maximum value and a minimum value are repeatedly generated so that the DC voltage is synchronized with a fluctuation of the AC voltage, and a duty ratio of PWM control is limited to a first duty ratio smaller than 100% over both a period in which the DC voltage is in the vicinity of the maximum value and in a period in which the DC voltage is in the vicinity of the minimum value.

10. An electrically powered tool comprising:
a rectifier circuit configured to rectify an AC voltage supplied from a commercial power supply to a pulsating DC voltage,
a smoothing circuit having a smoothing capacitor configured to reduce a pulsation state of the pulsating DC voltage,
a circuit configured to supply a DC voltage smoothed by the smoothing circuit to a motor, and
a tip tool configured to be driven by the motor,
wherein a current continuously flows to the motor when the motor is driven in a state in which the tip tool is not pressed against an object, and when a load applied to the tip tool is increased by pressing the tip tool against the object, the current flowing to the motor becomes intermittent.

11. The electrically powered tool according to claim 10, further comprising a power transmission mechanism, wherein the power transmission mechanism comprises a deceleration mechanism using a plurality of gears.

12. The electrically powered tool according to claim 10, further comprising:
a switching element provided between the smoothing circuit and the motor and configured to control the DC voltage supplied to the motor; and
a controller configured to control rotation of the motor by driving the switching element,
wherein the controller is configured to control the switching element so that in a case in which the motor is rotated in a state in which no load is applied to the tip tool, the current continuously flows to the motor.

13. The electrically powered tool according to claim 12, wherein the circuit comprises an inverter circuit, the inverter circuit is formed using a plurality of switching elements and provided between the smoothing circuit and the motor, and
the controller is configured to control the inverter circuit during no-load rotation of the motor so that the current continuously flows to the motor.

* * * * *